United States Patent Office  3,353,184
Patented Nov. 14, 1967

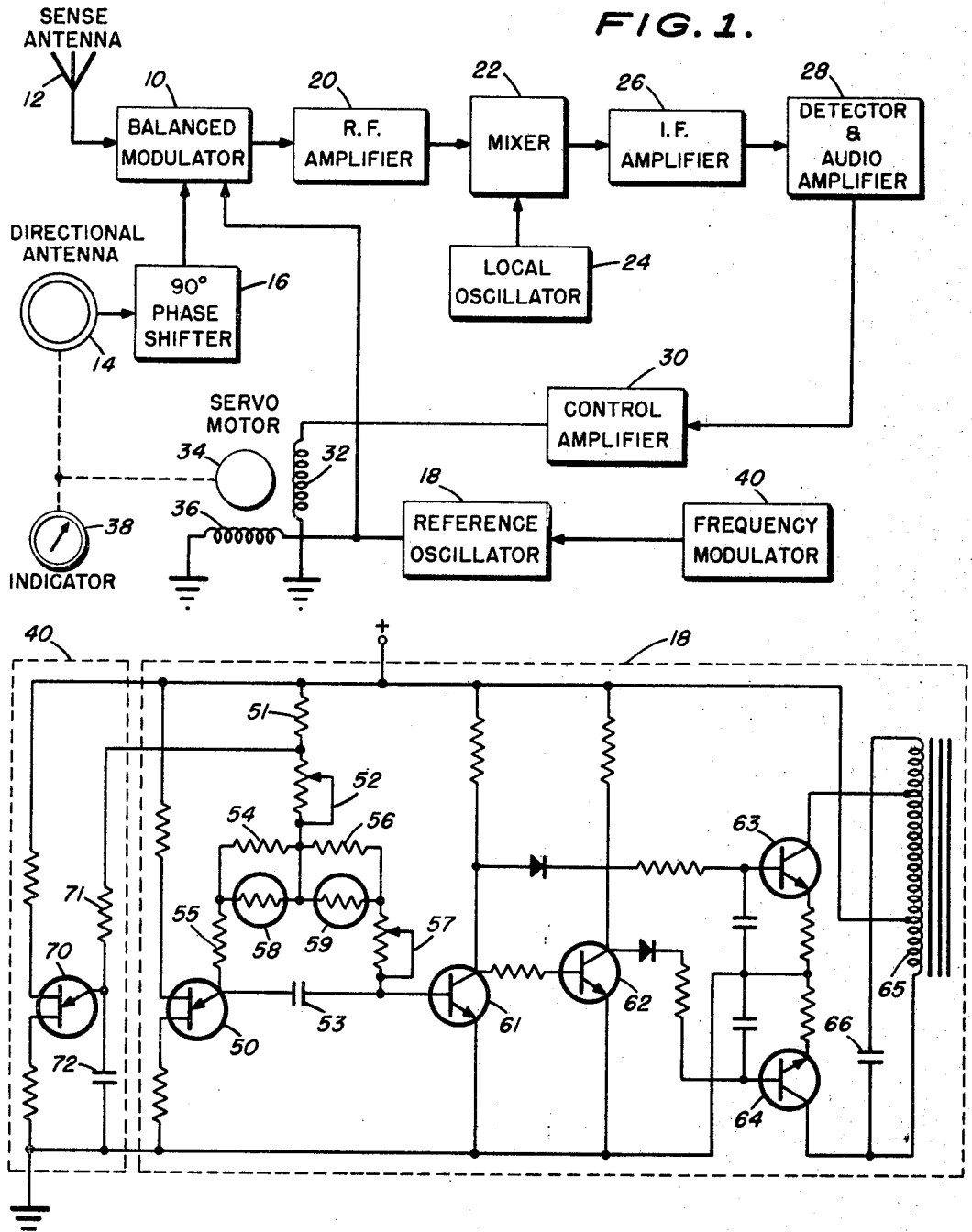

3,353,184
AUTOMATIC DIRECTION FINDER WITH FREQUENCY MODULATED SERVO CONTROL
Stanley F. Kadron, Reisterstown, Md., and Hans G. Ludwig, Ridgefield, Conn., assignors to The Bendix Corporation, Towson, Md., a corporation of Delaware
Filed Apr. 28, 1966, Ser. No. 545,898
5 Claims. (Cl. 343—117)

The present invention relates to automatic direction finding radio receivers. More particularly it concerns improvements in the loop antenna control which eliminate false bearings and hunting which may occur under certain adverse conditions.

Direction finding radio receivers have enjoyed long and respected use as marine and aviation navigational aids. These instruments depend upon the ability of a loop antenna to indicate the relative bearing from a receiving station to a transmitting station. When the loop antenna provides the sole signal input to the radio receiver, an ambiguity exists in the bearing indication. To overcome this ambiguity, signal from an omnidirectional sense antenna is compared in phase with signal from the loop antenna to determine whether the indicated bearing is the bearing to the transmitting station or the reciprocal bearing. The use of the instrument is further simplified by providing a loop servo drive which automatically rotates the loop to a null signal position and continuously provides indication of the bearing to the transmitting station. Typically, direction finders combined the signal received by the loop antenna with that received by the sense antenna in a balanced modulator to which is also applied a modulating signal from a reference oscillator operating at a low audio frequency. The modulator output is an audio modulated radio frequency signal in which the modulation envelope is either in phase or 180° out of phase with the reference audio signal. After detection to recover the modulation envelope, the resulting audio signal is applied to a servo system as an error signal. The servo motor rotates the loop in such direction as to reduce the error signal input to zero and in this condition the plane of the loop is aligned with the bearing to the transmitting station.

Certain signal conditions are capable of degrading or destroying the operation of such automatic direction finders. For example, if the received signal contains a transmitted audio signal equal to the reference oscillator frequency, the phase and amplitude relationship of error signal to the servomotor may be distorted in relationship to the reference signal. The servomotor may then run continuously, hunting for the signal null position. Or, if the motor does come to rest, the indicated bearing may be grossly in error.

It is therefore the primary object of the present invention to provide an automatic direction finding radio receiver which is substantially immune to disturbance by the modulation contained on the received signals.

It is a further object of the invention to provide an automatic direction finding radio receiver capable of providing accurate bearings in the presence of strong audio beat notes produced by heterodyning action between two or more transmitting stations or between a transmitting station and an inaccurately tuned receiver.

Another object of the invention is to provide an automatic direction finding radio receiver with a simplified reference oscillator circuit, the output of which is frequency modulated at a low rate.

Briefly, the present invention overcomes the adverse effects of certain modulation frequencies and beat notes in automatic direction finders by employing a reference oscillator having a self-varying-frequency. An interfering beat or modulation signal in the receiver output can then not assume a steady state phase and amplitude relationship with the reference oscillator output and the servomotor will not track the spurious signal.

In the drawings:
FIG. 1 is a functional block diagram of an automatic direction finding radio receiver improved in accordance with the invention; and
FIG. 2 is a schematic diagram of a reference oscillator improved according to the invention.

Referring to FIG. 1, a typical automatic direction finding receiver is shown as comprising a balanced modulator 10 which receives the combined outputs of an omnidirectional sense antenna 12 and a directional antenna 14. The directional antenna may comprise a rotatable loop or a fixed arm antenna with a rotatable sense coil as described in U.S. Patent 3,034,122 to Hemphill et al. A 90° phase difference exists between the outputs of antennas 12 and 14. A phase shifter 16 shifts the phase of the directional antenna signal to be either in phase or 180° out of phase with the sense antenna signal, depending upon the orientation of the directional antenna to the transmitting station. The modulation input to modulator 10 is from a reference oscillator 18 which conventionally provides a constant frequency output signal of 105 c.p.s. The output of modulator 10 then proceeds through conventional superheterodyne receiving circuits including an RF amplifier 20, a mixer 22 and local oscillator 24, an IF amplifier 26, and a detector and audio amplifier 28 to a control amplifier 30. Amplifier 30 supplies the control field 32 of an induction servomotor 34, the reference field 36 of which is excited by output from the reference oscillator 18. The rotor of servomotor 34 is mechanically coupled to the rotatable element of directional antenna 14 and to the bearing indicator 38.

Under ordinary circumstances, the voltage applied to the control field 32 of servomotor 34 is in quadrature with the voltage on the reference field 36. The control voltage either leads or lags the reference voltage depending upon the sense of the directional antenna error, causing the motor to rotate in the proper direction to reduce the control voltage to zero. Strong modulation of the received signal at the reference frequency or beat notes lying at or close to the reference frequency can cause false nulls or incorrect phase in the motor control voltage. To prevent these undesired signals from reaching a steady state relationship with the reference frequency, a frequency modulator 40 is provided for reference oscillator 18 to frequency modulate the oscillator output through a range of about 14 c.p.s. at a rate of 1–2 c.p.s. The low modulation index insures that the reference frequency will remain within the pass band of the servomotor control circuits while nevertheless avoiding a steady relationship with spurious audio signals.

The reference oscillator 18 and frequency modulator 40 are shown schematically in FIG. 2. The reference oscillator 18 is a relaxation type in which a unijunction transistor 50 receives emitter voltage from a frequency determining resistor-capacitor network including resistors 51, and 52, and capacitor 53. The base of a transistor 61 is connected to the side of capacitor 53 opposite the emitter of transistor 50. Forward bias is provided for transistor 61 through resistors 56 and 57. Capacitor 53 charges through resistors 51, 52, 54 and 55 until the triggering level of transistor 50 is reached. When transistor 50 fires, the base voltage of transistor 61 abruptly becomes negative and remains so for the time necessary for the negative charge to leak through resistors 56 and 57. Transistor 61 is nonconductive until the voltage at its base rises again to the forward conduction level. The collector current of transistor 61 is therefore of square waveform with a frequency controlled primarily by the time constant of resistors 52, 54 and 55 and capacitor 53 and the voltage applied to that network. The duty cycle of transistor 61 is controlled principally by the time constant of resistors 56 and 57 and capacitor 53. Resistors 52 and 57 may be adjusted to vary either of these quantities. Thermistors 58 and 59 stabilize the oscillator against temperature induced variations. Transistor 62 inverts the phase of the output of transistor 61 so that transistors 63 and 64 may be operated push-pull into a tuned load comprising an inductor 65 and a capacitor 66. The resonant load on the latter transistors shapes the square wave input into a sine wave sufficiently pure to provide satisfactory operation of the servomotor 34.

The frequency of the reference oscillator output is dependent upon the time constant of the resistor-capacitor network connected to the emitter of transistor 50 and upon the voltages applied both to the network and to the transistor. The frequency modulator 40 is arranged to introduce a periodic variation in the voltage of the resistor-capacitor network and thereby introduce a periodic variation in the frequency of the reference oscillator. A second relaxation oscillator is formed by a unijunction transistor 70 and the resistor 71-capacitor 72 frequency determining network. Capacitor 72 charges through resistor 51 which is a part of the frequency determining network of oscillator 18. Consequently the periodic variation in the charging current of capacitor 72 caused by conduction of transistor 70 introduces a variation in the emitter voltage of transistor 50 and thus modulates the frequency of the reference oscillator. The circuit parameters may suitably be selected to provide a center frequency for the reference oscillator of 112 c.p.s. modulated between 106 c.p.s. and 120 c.p.s. at a rate of 1-2 c.p.s. Obviously the servomotor may be designed to operate at other than the specified frequency, for example 46 c.p.s. is also often used for servomotors in automatic direction finders. In the latter event the reference oscillator would be designed to operate with a center frequency of 46 c.p.s. and the modulation index would be chosen so as to remain within the response capabilities of the servomotor.

The invention claimed is:

1. An automatic direction finding radio receiver comprising
   an omnidirectional sense antenna;
   a rotatable directional antenna;
   a reference oscillator;
   modulation means for combining signals from said sense antenna with signals from said directional antenna and the output of said reference oscillator to provide a modulation product indicative of the bearing from the receiver to the transmitter of signals received by said antennas;
   means for recovering from the output of said modulation means a signal having the frequency of the output of said reference oscillator;
   a servomotor controlled by said recovered signal for positioning said directional antenna; and
   means for continuously modulating the frequency of the output of said reference oscillator whereby response of said servomotor to spurious control signals is inhibited.

2. Apparatus as claimed in claim 1 wherein said servomotor includes a two phase induction motor having a fixed field and a control field; with means applying the output of said reference oscillator to said fixed field and means applying said recovered signal to said control field.

3. Apparatus as claimed in claim 1 wherein said reference oscillator comprises a relaxation oscillator together with means for shaping the waveform of the output of said relaxation oscillator into substantially sinusoidal waveforms.

4. Apparatus as claimed in claim 1 wherein said frequency modulating means comprises a second oscillator connected to vary the frequency of the output of said reference oscillator in accordance with said second oscillator output.

5. Apparatus as claimed in claim 3 wherein said frequency modulating means comprises a second oscillator connected to vary voltage supplied to said relaxation oscillator and thereby vary the frequency of the latter oscillator.

References Cited

UNITED STATES PATENTS

| | | | |
|---|---|---|---|
| 2,840,814 | 6/1958 | Hemphill et al. | 343—117 X |
| 3,150,373 | 9/1964 | Kadron et al. | 343—117 |

RODNEY D. BENNETT, *Primary Examiner.*

R. E. BERGER, *Assistant Examiner.*